(12) United States Patent
Suzuki

(10) Patent No.: US 11,827,184 B2
(45) Date of Patent: Nov. 28, 2023

(54) WIPER CONTROL DEVICE

(71) Applicant: DENSO CORPORATION, Kariya (JP)

(72) Inventor: Hidenobu Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 762 days.

(21) Appl. No.: 16/971,788

(22) PCT Filed: Feb. 18, 2019

(86) PCT No.: PCT/JP2019/005761
§ 371 (c)(1),
(2) Date: Aug. 21, 2020

(87) PCT Pub. No.: WO2019/163692
PCT Pub. Date: Aug. 29, 2019

(65) Prior Publication Data
US 2021/0039604 A1    Feb. 11, 2021

(30) Foreign Application Priority Data
Feb. 22, 2018  (JP) ................................. 2018-030029

(51) Int. Cl.
*B60R 16/023* (2006.01)
*B60S 1/08* (2006.01)
*G07C 5/08* (2006.01)

(52) U.S. Cl.
CPC .......... *B60S 1/0807* (2013.01); *B60R 16/023* (2013.01); *G07C 5/0808* (2013.01)

(58) Field of Classification Search
CPC .... B60S 1/0807; B60R 16/023; G07C 5/0808
See application file for complete search history.

(56) References Cited

FOREIGN PATENT DOCUMENTS

| CN | 103759952 A | 4/2014 |
|---|---|---|
| JP | H06-119507 A | 4/1994 |
| JP | 2002-351691 A | 12/2002 |
| JP | 2018-128892 A | 8/2018 |

OTHER PUBLICATIONS

Mar. 26, 2019 International Search Report issued in International Patent Application No. PCT/JP2019/005761.

*Primary Examiner* — Mathew Franklin Gordon
(74) *Attorney, Agent, or Firm* — Oliff PLC

(57) ABSTRACT

A control section is configured to perform rotation control of a wiper motor that causes a wiper blade to perform a wiping operation over a windshield, and a test unit is capable of communicating with the control section at a characteristic communication speed of the control section, and employs a specific communication with the control section at the characteristic communication speed to enable testing of the control section and the wiper motor by communication at a test communication speed of not less than the characteristic communication speed.

14 Claims, 4 Drawing Sheets

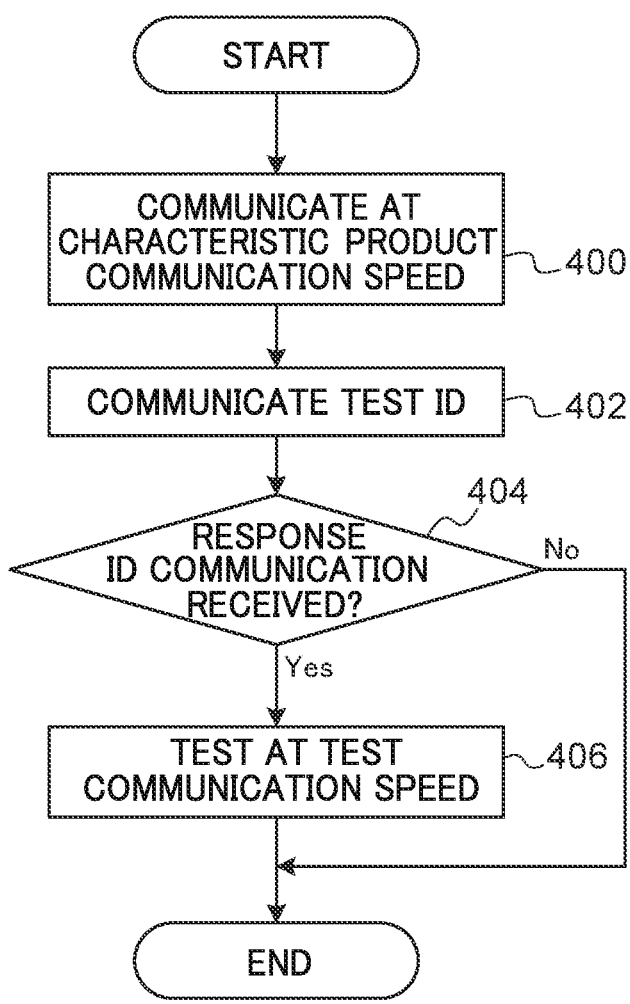

WIPER CONTROL DEVICE

TECHNICAL FIELD

The present disclosure relates to a wiper control device.

BACKGROUND ART

Wiper control devices that control a wiping operation of a wiper device include a control circuit provided with a microcomputer. When a wiper device product is to be shipped, a test is performed to check that the control circuit and a wiper motor are operating correctly. During this test, for example, a dedicated test device is electrically connected to the wiper control device and a test signal is input to the control circuit of the wiper control device. The wiper control device and the wiper motor are determined to be operating normally in cases in which a specific response is received from the control circuit of the wiper control device.

Japanese Patent Application Laid-Open (JP-A) No. 2002-351691 discloses a test system in which microcomputers configuring control circuits are accessed by an external tool in order to test operational states of the control circuits.

SUMMARY OF INVENTION

Technical Problem

However, the communication speed of communication between the control circuits and the external tool varies according to the specifications of each control circuit. Thus, in the invention disclosed in JP-A No. 2002-351691, in cases in which test subjects are configured by wiper control devices of various types, an issue arises in that the communication speed for testing needs to be changed each time the wiper control device configuring the test subject is changed.

In cases in which respective test equipment compatible with the characteristic communication speed of each respective specification of the wiper control devices is required in order to perform testing compatible with the characteristic communication speeds of the respective specifications, a different test device needs to be employed for each different specification of the wiper control devices configuring the test subjects, resulting in costly and laborious testing.

Another issue arises in that products with lower characteristic communication speeds require longer testing times than product with higher communication speeds.

In consideration of the above circumstances, an object of the present disclosure is to provide a wiper control device capable of being tested at a test communication speed.

Solution to Problem

A first aspect of the present disclosure is a wiper control device including a control section configured to perform rotation control of a wiper motor that causes a wiper blade to perform a wiping operation over a windshield, and a test unit that is capable of communicating with the control section at a characteristic communication speed of the control section, and that employs a specific communication with the control section at the characteristic communication speed to enable testing of the control section and the wiper motor by communication at a test communication speed of not less than the characteristic communication speed.

A wiper control device of a second aspect of the present disclosure is the wiper control device of the first aspect, wherein the specific communication is executed after a communication from the test unit to the control section at the characteristic communication speed to activate the control section has been performed within a test mode transition reception duration measured from the control section adopting an ON state.

A wiper control device of a third aspect of the present disclosure is the wiper control device of the first aspect or the second aspect, wherein the specific communication from the test unit to the control section is performed at the characteristic communication speed within a specific duration as measured from the control section adopting an ON state, and includes a test mode transition communication to cause the control section to transition to a test mode.

A wiper control device of a fourth aspect of the present disclosure is the wiper control device of the third aspect, wherein the control section is configured to perform a response communication to the test unit at the test communication speed to indicate that the control section has transitioned to the test mode in response to the test mode transition communication.

A wiper control device of a fifth aspect of the present disclosure is the wiper control device of the fourth aspect, wherein in cases in which the response communication has been received, the test unit is configured to perform a test communication to the control section at the test communication speed to test the control section and the wiper motor within the specific duration as measured from the test mode transition communication.

A wiper control device of a sixth aspect of the present disclosure is the wiper control device of any one of the third aspect to the fifth aspect, wherein the control section sets a communication speed to the characteristic communication speed in cases in which a communication at the test communication speed has not been performed within the specific duration.

Advantageous Effects of Invention

According to the wiper control device of the first aspect of the present disclosure, the specific communication is employed to enable testing at the test communication speed. In cases in which the test communication speed is faster than the characteristic communication speed of the control section, this enables the time required for testing to be shortened.

According to the wiper control device of the second aspect of the present disclosure, the communication to activate the control section enables test communication to be performed.

According to the wiper control device of the third aspect of the present disclosure, the specific communication performed at the characteristic communication speed of the control section within the specific duration as measured from the control section adopting the ON state and including the test mode transition communication to cause the control section to transition to the test mode enables testing at the test communication speed.

According to the wiper control device of the fourth aspect of the present disclosure, the response communication indicating that the control section has transitioned to the test mode enables testing at the test communication speed to be started.

According to the wiper control device of the fifth aspect of the present disclosure, performing the test communication to test the control section and the wiper motor within the specific duration as measured from the test mode transition communication enables testing at the test communication speed.

According to the wiper control device of the sixth aspect of the present disclosure, stopping communication from the test unit at the test communication speed enables the communication speed of the control section to be reverted to the characteristic communication speed of the control section.

BRIEF DESCRIPTION OF DRAWINGS

FIG. 4 is a flowchart illustrating an example of pre-shipping test processing of a wiper control device by a test device according to an exemplary embodiment of the present disclosure.

DESCRIPTION OF EMBODIMENTS

Figure 1:
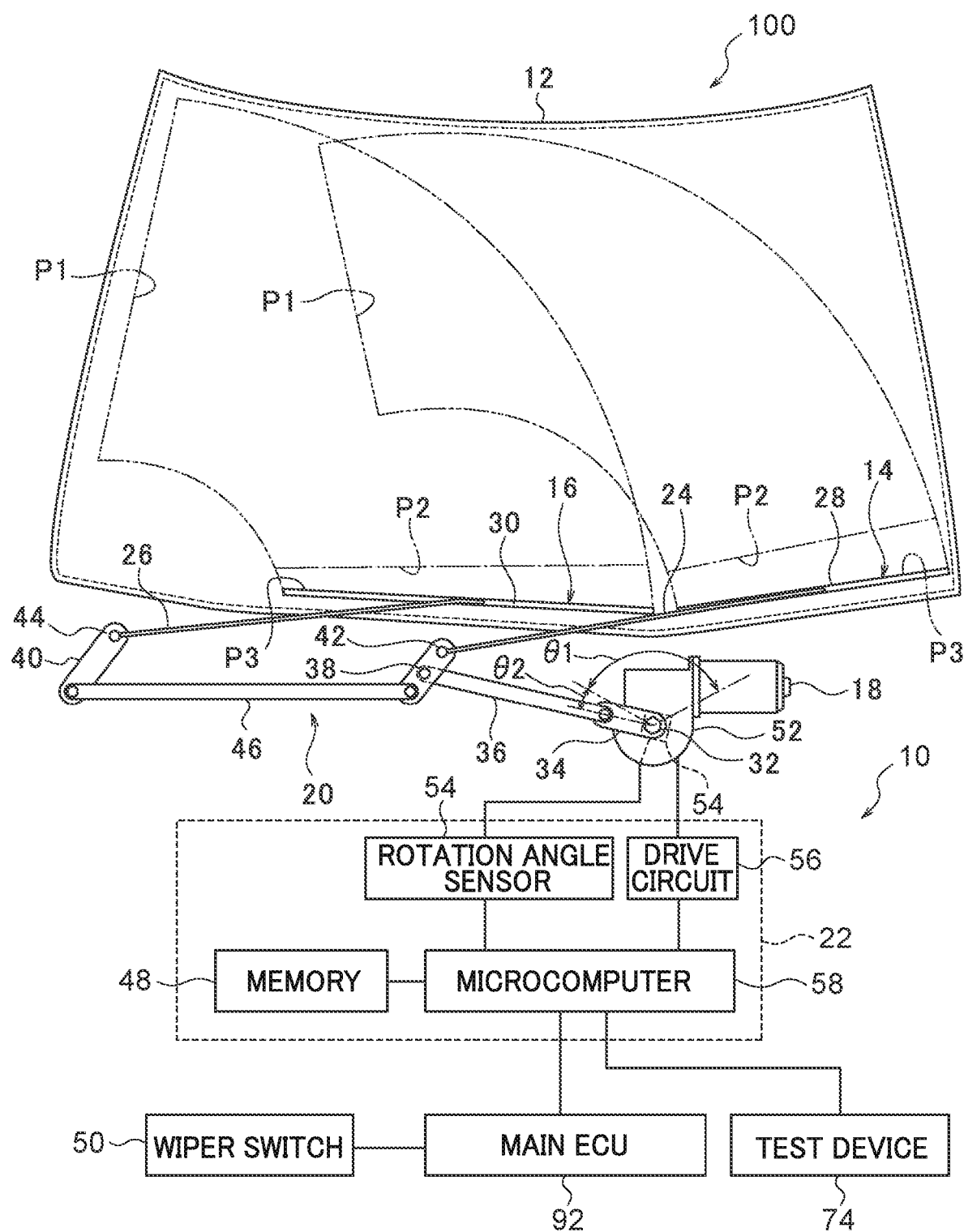
FIG. 1 is a schematic diagram illustrating a configuration of a wiper device including a wiper control device according to an exemplary embodiment of the present disclosure.

FIG. 1 is a schematic diagram illustrating a configuration of a wiper device 100 including a wiper control device 10 according to an exemplary embodiment. The wiper device 100 is, for example, a device for wiping a windshield glass (windshield) 12 installed to a vehicle such as a passenger car. The wiper device 100 includes a pair of wipers 14, 16, a wiper motor 18, a link mechanism 20, and the wiper control device 10.

The wipers 14, 16 are configured by respective wiper arms 24, 26 and wiper blades 28, 30. Base end portions of the wiper arms 24, 26 are respectively fixed to pivot shafts 42, 44, described later. The wiper blades 28, 30 are respectively fixed to leading end portions of the wiper arms 24, 26.

The wiper blades 28, 30 of the wipers 14, 16 perform a to-and-fro operation over the windshield glass 12 accompanying operation of the wiper arms 24, 26, such that the wiper blades 28, 30 wipe the windshield glass 12.

The wiper motor 18 includes an output shaft 32 coupled through a speed reduction mechanism 52 configured mainly by a worm gear. The output shaft 32 is capable of rotating in forward and reverse directions. The link mechanism 20 includes a crank arm 34, a first link rod 36, a pair of pivot levers 38, 40, the pair of pivot shafts 42, 44, and a second link rod 46.

One end side of the crank arm 34 is fixed to the output shaft 32, and the other end side of the crank arm 34 is operably coupled to one end side of the first link rod 36. The other end side of the first link rod 36 is operably coupled to the pivot lever 38 at a location nearer to the other end of the pivot lever 38 than the end where the pivot shaft 42 is located. The two ends of the second link rod 46 are operably coupled to the pivot lever 38 at the other end of the pivot lever 38 to the end where the pivot shaft 42 is located, and to the pivot lever 40 at the end of the pivot lever 40 corresponding to the same end of the pivot lever 38.

The pivot shafts 42, 44 are operably supported by non-illustrated pivot holders provided on the vehicle body. The wiper arms 24, 26 are fixed, via the pivot shafts 42, 44, to the ends of the pivot levers 38, 40 where the pivot shafts 42, 44 are located.

In the wiper device 100 including the wiper control device 10 according to the present exemplary embodiment, when the output shaft 32 is rotated forward or in reverse through a rotation angle θ1 within a specific range, rotation force of the output shaft 32 is transmitted to the wiper arms 24, 26 through the link mechanism 20, and the wiper blades 28, 30 perform a to-and-fro operation over the windshield glass 12 between a lower return position P2 and an upper return position P1 accompanying the to-and-fro operation of the wiper arms 24, 26. Various values may be employed as the value of θ1 according to the configuration of the link mechanism of the wiper control device and the like, and in the present exemplary embodiment θ1 is, for example, 140°.

As illustrated in FIG. 1, in the wiper device 100 including the wiper control device 10 according to the present exemplary embodiment, a configuration is adopted in which the crank arm 34 and the first link rod 36 form a straight line shape when the wiper blades 28, 30 are positioned at a stowed position P3.

The stowed position P3 is provided below the lower return position P2. The wiper blades 28, 30 are operated to the stowed position P3 by rotating the output shaft 32 by a rotation angle θ2 from a state in which the wiper blades 28, 30 are already at the lower return position P2. Various values may be employed as the value of θ2 according to the configuration of the link mechanism of the wiper device and the like, and in the present exemplary embodiment θ2 is, for example, 10°.

Note that in cases in which the rotation angle θ2 is "0", the lower return position P2 and the stowed position P3 are aligned with each other and the wiper blades 28, 30 are stopped and stowed at the lower return position P2.

A wiper motor control circuit 22 for controlling rotation of the wiper motor 18 is connected to the wiper motor 18. The wiper motor control circuit 22 according to the present exemplary embodiment includes a microcomputer and a drive circuit 56 that generates a voltage for application to a coil of the wiper motor 18.

The microcomputer 58 of the wiper motor control circuit 22 controls the rotation speed of the wiper motor 18 based the detection result of a rotation angle sensor 54 for detecting the rotation speed and the rotation angle of the output shaft 32 of the wiper motor 18. The rotation angle sensor 54 is provided inside the speed reduction mechanism 52 of the wiper motor 18, and detects by converting a magnetic field (magnetic force) of a sensor magnet that rotates coupled to the output shaft 32 into a current.

Since the wiper motor 18 according to the present exemplary embodiment includes the speed reduction mechanism 52 as mentioned above, the rotation speed and rotation angle of the output shaft 32 are not the same as the rotation speed and rotation angle of a wiper motor main body. However, in the present exemplary embodiment, the wiper motor main body and the speed reduction mechanism 52 are configured as an inseparable integral body, and so hereinafter the rotation speed and rotation angle of the output shaft 32 are taken as being synonymous with the rotation speed and rotation angle of the wiper motor 18.

The microcomputer 58 is able to compute the position on the windshield glass 12 of the wiper blades 28, 30 and the rotation speed of the output shaft 32 from the rotation angle of the output shaft 32 as detected by the rotation angle sensor 54, and controls the drive circuit 56 so as to change the rotation speed of the output shaft 32 according to this computed position. The drive circuit 56 is a circuit for generating a voltage for application to the wiper motor 18 under control of the wiper motor control circuit 22. The drive circuit 56 generates the voltage to be applied to the wiper motor 18 by switching power from a vehicle battery acting as a power source. Data relating to control of the drive circuit 56 is held in memory 48.

A wiper switch 50 is connected to the microcomputer 58 of the wiper motor control circuit 22 through a main electronic control unit (ECU) 92 that controls a vehicle engine and the like. The wiper switch 50 is a switch that switches the supply of power from the vehicle battery to the wiper motor 18 ON or OFF. The wiper switch 50 is capable of being switched to a low speed operation mode selection position (LOW) to operate the wiper blades 28, 30 at low speed, a high speed operation mode selection position (HIGH) to operate the wiper blades 28, 30 at high speed, an intermittent operation mode selection position (INT) to operate the wiper blades 28, 30 intermittently at a fixed cycle, an automatic operation mode selection position (AUTO) to operate the wiper blades 28, 30 when a rain sensor (not illustrated in the drawings) has detected water droplets, and a stop mode selection position (OFF). Command signals to rotate the wiper motor 18 according to the selection positions of the respective modes are output to the microcomputer 58 through the main ECU 92. For example, the wiper motor 18 is rotated at high speed when the wiper switch 50 is in the high speed operation mode selection position, the wiper motor 18 is rotated at low speed when the wiper switch 50 is in the low speed operation mode selection position, and the wiper motor 18 is rotated intermittently when the wiper switch 50 is in the intermittent operation mode selection position.

When the signal output from the wiper switch 50 according to the selection position of the corresponding mode is input to the microcomputer 58 through the main ECU 92, the microcomputer 58 performs control according to the command signal from the wiper switch 50. Specifically, the microcomputer 58 controls the voltage applied to the wiper motor 18 such that the wiper blades 28, 30 are operated at the desired to-and-fro wiping cycle in response to the command signal from the wiper switch 50.

A test device 74 is connected to the microcomputer 58 of the wiper control device 10 in order to test the product prior to shipping. The wiper control device 10 (microcomputer 58) is capable of communicating with equipment connected thereto, and examples of a communication protocol employed between the test device 74 and the microcomputer 58 include a local interconnect network (LIN) or a controller area network (CAN). The microcomputer 58 communicates with the connected equipment at a characteristic communication speed of the product that is compatible with the vehicle in which it is installed. As described later, executing a specific communication routine with the test device 74 also enables the microcomputer 58 to communicate at a test communication speed.

Figure 2:
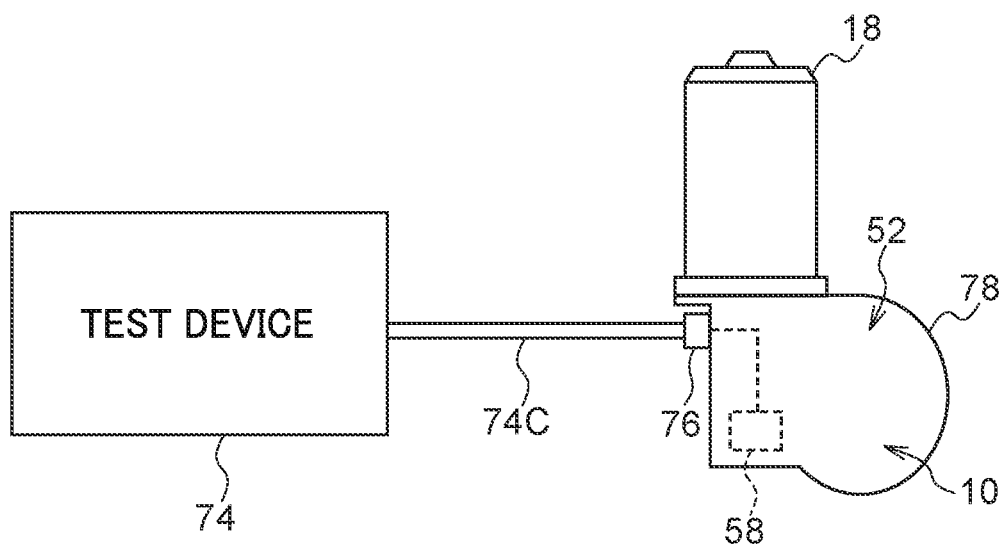
FIG. 2 is a schematic diagram illustrating an example of a connection between a wiper control device and a test device during a pre-shipping test of a product.

FIG. 2 is a schematic diagram illustrating an example of a connection between the wiper control device 10 and the test device 74 during a pre-shipping product test. The wiper control device 10 is for example housed together with the speed reduction mechanism 52 inside a housing 78 of the wiper motor 18, as a substrate installed with elements including the microcomputer 58.

During testing, the microcomputer 58, configuring an electronic control unit (ECU) of the wiper control device 10, is accessed by connecting a cable 74C of the test device 74 to a connector 76 provided to the housing 78 of the wiper motor 18. As mentioned previously, LIN, CAN, or the like may be employed as the communication protocol for this access. When the wiper control device 10 is installed in a vehicle, a vehicle harness is connected to the connector 76, and control signals are input through this harness based on operation of the wiper switch 50 and so on. Electric power to operate the wiper control device 10 and the wiper motor 18 is also supplied through this harness. In the present exemplary embodiment, test signals and electric power to operate the wiper control device 10 and the wiper motor 18 are supplied from the test device 74 during testing.

The test device 74 is capable of communicating at the characteristic product communication speed of the wiper control device 10 and also of communicating at the test communication speed. The test communication speed is a higher speed than the characteristic product communication speed in most cases, and even in cases in which the wiper control device 10 has a high characteristic product communication speed, the test communication speed is at least equivalent to the characteristic product communication speed. As an example, the characteristic product communication speed is approximately 10 kbps to 20 kbps, and the test communication speed is approximately 20 kbps.

Figure 3:
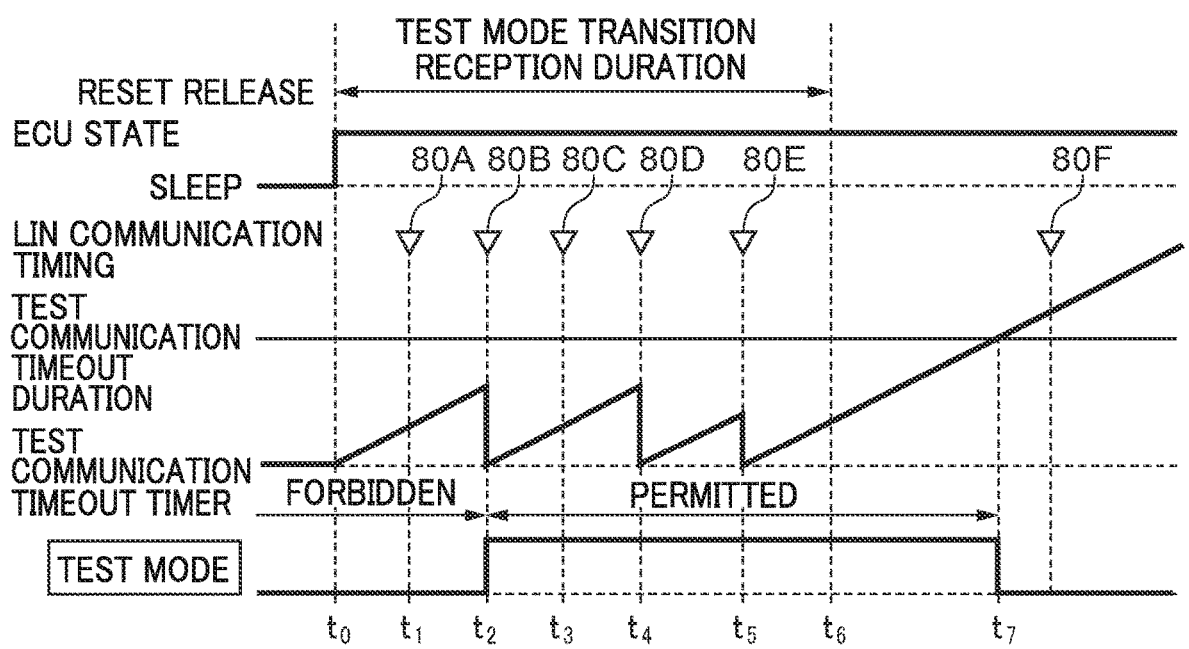
FIG. 3 is a time chart illustrating an example of communication performed during a pre-shipping test of a wiper control device according to an exemplary embodiment of the present disclosure.

FIG. 3 is a time chart illustrating an example of communication during the pre-shipping test of the wiper control device 10 according to the present exemplary embodiment. In the wiper control device 10 according to the present exemplary embodiment, the power source switched ON at a timing $t_0$, after which a communication 80A at the characteristic product communication speed is performed by the test device 74 at a timing $t_1$. The communication 80A includes a type of activation signal to release the ECU configuring the microcomputer 58 from an initial stopped state. In the present exemplary embodiment, the communication 80A can be executed during a duration between the power source switch-on timing $t_0$ and a timing $t_6$. This duration varies according to the specifications of the wiper control device 10, and may for example be approximately 0.5 to 5 seconds. This limited duration during which the communication 80A is permitted after switching ON the power source of the wiper control device 10 is referred to as a test mode transition reception duration in the present exemplary embodiment.

After the communication 80A is performed at the timing $t_1$, a communication 80B is performed at a timing $t_2$. The communication 80B is a communication including a test ID that causes the wiper control device 10 to transition to a test mode. When the wiper control device 10 has transitioned to the test mode in response to the input test ID, the wiper control device 10 transmits a communication 80C to the test device 74 at the test communication speed at a timing $t_3$. The communication 80C includes a response ID indicating the transition to the test mode. As illustrated in FIG. 3, when the wiper control device 10 has transitioned to the test mode, a test mode transitions from "forbidden" to "permitted". As illustrated in FIG. 3, the communication 80B performed at the timing $t_2$ needs to be performed within a specific test communication timeout duration, described later, as measured from the timing $t_0$ when the power source was switched ON.

After receiving the communication 80C including the response ID at the timing $t_3$, the test device 74 performs communications 80D, 80E that are test communications at the test communication speed at timings $t_4$ and $t_5$ respectively. The communications 80D, 80E are communications for performing operational checks of the microcomputer 58, the memory 48, the drive circuit 56 configured by switching elements, and so on of the wiper control device 10, for checking continuity of the circuitry of the wiper motor 18, and so on.

The communications 80B, 80D, 80E transmitted from the test device 74 need to be performed before a test communication timeout timer reaches the end of the test communication timeout duration. The test communication timeout duration varies according to the specifications of the wiper control device 10, and is from several hundred milliseconds to several seconds. As illustrated in FIG. 3, when the test communication timeout duration has elapsed since the most recent communication, the test mode transitions from "permitted" to "forbidden" as illustrated at a timing $t_7$ in FIG. 3, and communication at the test communication speed ends. The wiper control device 10 thus ceases to be responsive to test communications, even supposing a communication 80F were to be subsequently performed. Thus, in the present exemplary embodiment, the wiper control device 10 exits the test mode and communicates at its characteristic product communication speed once the test communication has ended.

FIG. 4 is a flowchart illustrating an example of pre-shipping test processing of the wiper control device 10 by the test device 74 according to the present exemplary embodiment. The processing illustrated in FIG. 4 is started by the test device 74 when the power source of the wiper control device 10 is set to ON. At step 400, the communication 80A is performed at the characteristic product communication speed within the test mode transition reception duration previously described.

At step 402, the communication 80C including the test ID is performed at the characteristic product communication speed. At step 404, determination is made as to whether or not the communication 80C including the response ID has been transmitted from the wiper control device 10. In cases in which that the communication 80C is determined to been received at step 404, the communication speed is switched to the test communication speed, the test communications 80D, 80E are performed, and the processing is then ended. In cases in which the communication 80C is determined not to have been received at step 404, the processing is ended.

As described above, in the present exemplary embodiment, the test device 74 performs the communication 80B including the test ID within the specific test communication timeout duration measured from when the power source of the microcomputer 58 of the wiper control device 10 is switched ON. In response to the communication 80B including the test ID, the wiper control device 10 transmits the communication 80C, including the response ID to indicate its transition to the test mode, to the test device 74 at the test communication speed. After receiving the communication 80C including the response ID, the test device 74 performs the test communications 80D, 80E at the test communication speed. Testing can thus be performed at the test communication speed.

The entire content of the disclosure of Japanese Patent Application No. 2018-030029 filed on Feb. 22, 2018 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A wiper control device comprising:
a control section configured to perform rotation control of a wiper motor that causes a wiper blade to perform a wiping operation over a windshield; and
a test unit that is capable of communicating with the control section at a characteristic communication speed of the control section, and that employs a specific communication with the control section at the characteristic communication speed to enable testing of the control section and the wiper motor by communication at a test communication speed of not less than the characteristic communication speed.

2. The wiper control device of claim 1, wherein:
the specific communication is executed after a communication from the test unit to the control section at the characteristic communication speed to activate the control section has been performed within a test mode transition reception duration measured from the control section adopting an ON state.

3. The wiper control device of claim 1, wherein:
the specific communication from the test unit to the control section is performed at the characteristic communication speed within a specific duration as measured from the control section adopting an ON state, and includes a test mode transition communication to cause the control section to transition to a test mode.

4. The wiper control device of claim 2, wherein:
the specific communication from the test unit to the control section is performed at the characteristic communication speed within a specific duration as measured from the control section adopting an ON state, and includes a test mode transition communication to cause the control section to transition to a test mode.

5. The wiper control device of claim 3, wherein:
the control section is configured to perform a response communication to the test unit at the test communication speed to indicate that the control section has transitioned to the test mode in response to the test mode transition communication.

6. The wiper control device of claim 4, wherein:
the control section is configured to perform a response communication to the test unit at the test communication speed to indicate that the control section has transitioned to the test mode in response to the test mode transition communication.

7. The wiper control device of claim 5, wherein:
in cases in which the response communication has been received, the test unit is configured to perform a test communication to the control section at the test communication speed to test the control section and the wiper motor within the specific duration as measured from the test mode transition communication.

8. The wiper control device of claim 6, wherein:
in cases in which the response communication has been received, the test unit is configured to perform a test communication to the control section at the test communication speed to test the control section and the wiper motor within the specific duration as measured from the test mode transition communication.

9. The wiper control device of claim 3, wherein:
the control section sets a communication speed to the characteristic communication speed in cases in which a communication at the test communication speed has not been performed within the specific duration.

10. The wiper control device of claim 4, wherein:
the control section sets a communication speed to the characteristic communication speed in cases in which a communication at the test communication speed has not been performed within the specific duration.

11. The wiper control device of claim 5, wherein:
the control section sets a communication speed to the characteristic communication speed in cases in which a communication at the test communication speed has not been performed within the specific duration.

12. The wiper control device of claim 6, wherein:
the control section sets a communication speed to the characteristic communication speed in cases in which a communication at the test communication speed has not been performed within the specific duration.

13. The wiper control device of claim 7, wherein:
the control section sets a communication speed to the characteristic communication speed in cases in which a communication at the test communication speed has not been performed within the specific duration.

14. The wiper control device of claim 8, wherein:
the control section sets a communication speed to the characteristic communication speed in cases in which a communication at the test communication speed has not been performed within the specific duration.

\* \* \* \* \*